US010656938B2

(12) United States Patent
Mairet et al.

(10) Patent No.: US 10,656,938 B2
(45) Date of Patent: May 19, 2020

(54) EXTERNAL COMMENT STORAGE AND ORGANIZATION

(71) Applicant: INTERNATIONAL BUSINESS MACHINES CORPORATION, Armonk, NY (US)

(72) Inventors: Jay G. Mairet, Austin, TX (US); Dylan C. McDougall, Austin, TX (US); Michael J. McEleney, Travis, TX (US); Arjay A. Vander Velden, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/140,835

(22) Filed: Sep. 25, 2018

(65) Prior Publication Data
US 2020/0097284 A1    Mar. 26, 2020

(51) Int. Cl.
*G06F 8/73* (2018.01)
*G06F 16/25* (2019.01)
*G06F 16/23* (2019.01)

(52) U.S. Cl.
CPC ............ *G06F 8/73* (2013.01); *G06F 16/2379* (2019.01); *G06F 16/252* (2019.01)

(58) Field of Classification Search
None
See application file for complete search history.

(56) References Cited

U.S. PATENT DOCUMENTS 4,860,203 A * 8/1989 Corrigan .................. G06F 8/41
717/123
6,275,223 B1   8/2001 Hughes
(Continued)

FOREIGN PATENT DOCUMENTS

CN    102339218 A    2/2012
EP    1585026 A1   10/2005

OTHER PUBLICATIONS

"A Method and Tool to Improve Code Review Comments Management," IP.com, IPCOM000230985D, Sep. 22, 2013, 4 pages.
(Continued)

*Primary Examiner* — Philip Wang
(74) *Attorney, Agent, or Firm* — Cantor Colburn LLP; Joseph Petrokaitis

(57) ABSTRACT

Systems, methods, and computer-readable media are described for external storage and organization of documentation for computer-executable source code. An executable program is provided that receives a selected codebase as input and generates or updates a code comment database corresponding thereto that provides a structured framework for documenting the codebase externally from the codebase. The executable program provides a user with the capability to add and/or edit comments for each structure in a codebase that is represented in a corresponding code comment database. A user can navigate through a code comment database using a user interface that includes a visual representation of a nested hierarchy of functions of the codebase. The visual representation can be manipulated by a user to provide an identification of arguments, variables, called functions, or the like for each function. Code documentation can also be displayed in association with the visual representation.

17 Claims, 8 Drawing Sheets

(56) References Cited

U.S. PATENT DOCUMENTS

| | | | |
|---|---|---|---|
| 6,804,686 B1* | 10/2004 | Stone | G06F 8/10 |
| 6,951,010 B2 | 9/2005 | Sasaki | |
| 6,993,720 B1* | 1/2006 | Hanoch | G06F 9/453 |
| | | | 715/708 |
| 7,454,744 B2 | 11/2008 | Bhogal et al. | |
| 7,461,368 B2 | 12/2008 | White | |
| 7,500,221 B2 | 3/2009 | Baumann | |
| 8,418,130 B2 | 4/2013 | Tittizer et al. | |
| 2003/0037312 A1* | 2/2003 | Czech | G06F 8/42 |
| | | | 717/120 |
| 2003/0221186 A1* | 11/2003 | Bates | G06F 11/3664 |
| | | | 717/125 |
| 2004/0205708 A1* | 10/2004 | Kothari | G06F 8/30 |
| | | | 717/113 |
| 2005/0005258 A1* | 1/2005 | Bhogal | G06F 8/73 |
| | | | 717/102 |
| 2007/0226345 A1* | 9/2007 | Luckhardt | H04N 1/00212 |
| | | | 709/227 |
| 2007/0250810 A1 | 10/2007 | Tittizer et al. | |
| 2008/0113327 A1* | 5/2008 | Larcheveque | G09B 19/00 |
| | | | 434/350 |
| 2008/0263518 A1 | 10/2008 | Bank et al. | |
| 2010/0146491 A1 | 6/2010 | Hirano et al. | |
| 2012/0110030 A1 | 5/2012 | Pompino | |
| 2015/0074145 A1* | 3/2015 | Homer | G06F 16/93 |
| | | | 707/772 |
| 2015/0278235 A1* | 10/2015 | Norwood | H04L 67/02 |
| | | | 715/234 |
| 2015/0347128 A1* | 12/2015 | Frenkiel | G06F 16/178 |
| | | | 717/123 |

OTHER PUBLICATIONS

"JavaDocMerge Tool for Separating JavaDoc Information from Java Source," IP.com, IPCOM000016105D, Sep. 23, 2002, 2 pages.

Kelly, J. A., "Providing Hypertext Links to Code," IBM TDB, v37, n12, Dec. 1994, pp. 345-348, IP.com, IPCOM000114389D.

Marlow, Simon, "Haddock, a Haskell Documentation Tool," Proceedings of the 2002 ACM SIGPLAN Workshop on Haskell: 78-89, ACM, 2002.

Oracle Technology Network "Javadoc Tool", retrieved from: https://www.oracle.com/technetwork/articles/java/index-jsp-135444.html; downloaded Nov. 4, 2019; 1 pg.

* cited by examiner

FIG. 4B

```
File Edit Search View Encoding Language Settings Macro Run Plugins Window ?
averager
▼ int main
    ▪ int argc
    ▪ char**argv
    ▪ double average
    ▪ int numbers
    ▪ int i
    ▪ int num_of_values
  ▸ int to_integer
    ▪ int argc
    ▪ char**argv
    ▪ double average
    ▪ int numbers
    ▪ int i
    ▪ int num_of_values
  ▸ int find_average
```

412 — points to int to_integer block
414 — points to int argc / char**argv
416 — points to double average / int numbers / int i / int num_of_values
402A — lower panel callout to_integer
Description
    Converts a string into an integer
Arguments
    char *str:
        The null terminated string to be converted.
    int *number
        A pointer to the resulting integer.
Return Value
    0:   No errors
    -1:  Error
Variables
    int i:      Iterator used to convert each character in the string into a digit.
    char current_character:
                The current character to convert into a digit.
    int current_number:
                The digit converted from the current character.
    int string_length:
                The length of str.
    double max_size:
                Used to make sure the integer is not greater than the maximum integer size.
Notes
    Each character in the string is converted into a single digit and added to the number. The number is shifted over a place value by multiplying it by ten before adding the converted digit.
Calling Functions
    main
Functions Called
File
    averager.c 400 — window
402B — upper panel callout

EXTERNAL COMMENT STORAGE AND ORGANIZATION

BACKGROUND

The present invention relates generally to external comment storage and organization for computer-executable source code, and more particularly, to a framework for generating and navigating through code documentation for computer-executable source code that is provided externally to the source code.

Code comments are typically provided to inform a user about how computer-executable code operates such as what a particular function does within the code. Code comments, however, are often unorganized and lack standardization, which can make understanding unfamiliar code difficult. Further, code comments are typically inserted directly into the computer-executable code, which can clutter the code and further exacerbate understanding of the code.

SUMMARY

In one or more example embodiments, a method for external storage and organization of documentation for computer-executable source code is disclosed. The method includes receiving, from a user, an indication of a selected codebase, determining that a code comment database does not exist for the selected codebase, generating a new code comment database for the selected codebase, and presenting, to the user, a user interface for navigating the new code comment database.

In one or more other example embodiments, a system for external storage and organization of documentation for computer-executable source code is disclosed. The system includes at least one memory storing computer-executable instructions and at least one processor configured to access the at least one memory and execute the computer-executable instructions to perform a set of operations. The operations include receiving, from a user, an indication of a selected codebase, determining that a code comment database does not exist for the selected codebase, generating a new code comment database for the selected codebase, and presenting, to the user, a user interface for navigating the new code comment database.

In one or more other example embodiments, a computer program product for external storage and organization of documentation for computer-executable source code is disclosed. The computer program product includes a non-transitory storage medium readable by a processing circuit, the storage medium storing instructions executable by the processing circuit to cause a method to be performed. The method includes receiving, from a user, an indication of a selected codebase, determining that a code comment database does not exist for the selected codebase, generating a new code comment database for the selected codebase, and presenting, to the user, a user interface for navigating the new code comment database.

In one or more example embodiments, the selected codebase is a first selected codebase, and the method or operations further include receiving, from the user, an indication of a second selected codebase, retrieving an existing code comment database for the second selected codebase, and presenting, to the user, a user interface for navigating the existing code comment database.

In one or more example embodiments, the method or operations further include scanning the second selected codebase to identify new structures in the second selected codebase, generating new database entries corresponding to the new structures in the second selected codebase, and updating the existing code comment database to include the new database entries.

In one or more example embodiments, the method or operations further include prompting the user for code documentation and inserting the code documentation into the new code comment database.

In one or more example embodiments, the user interface includes an indication of a first function in a nested hierarchy of functions and a first selectable indicia associated with the indication of the first function, and the method or operations further include receiving, from the user, a selection of the first selectable indicia and displaying, in the user interface, a representation of a structure of the first function, the representation of the structure of the first function including i) an indication of one or more arguments of the first function, ii) an indication of one or more variables defined in the first function, and iii) an indication of one or more additional functions in the nested hierarchy of functions that are called by the first function.

In one or more example embodiments, the method or operations further include displaying, in the user interface, code documentation corresponding to at least one of: i) the arguments of the first function, ii) the variables defined in the first function, or iii) the one or more additional functions in the nested hierarchy of functions.

In one or more example embodiments, the selectable indicia is a first selectable indicia, and the method or operations further include displaying, in the user interface, a second indicia in association with a second function of the one or more additional functions in the nested hierarchy of functions, receiving, from the user, a selection of the second indicia, and displaying, in the user interface, a representation of a structure of the second function.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIGS. 4A, 4B, and 4C depict an example UI for displaying and enabling navigation of a code comment database in accordance with one or more example embodiments.

DETAILED DESCRIPTION

Figure 1:
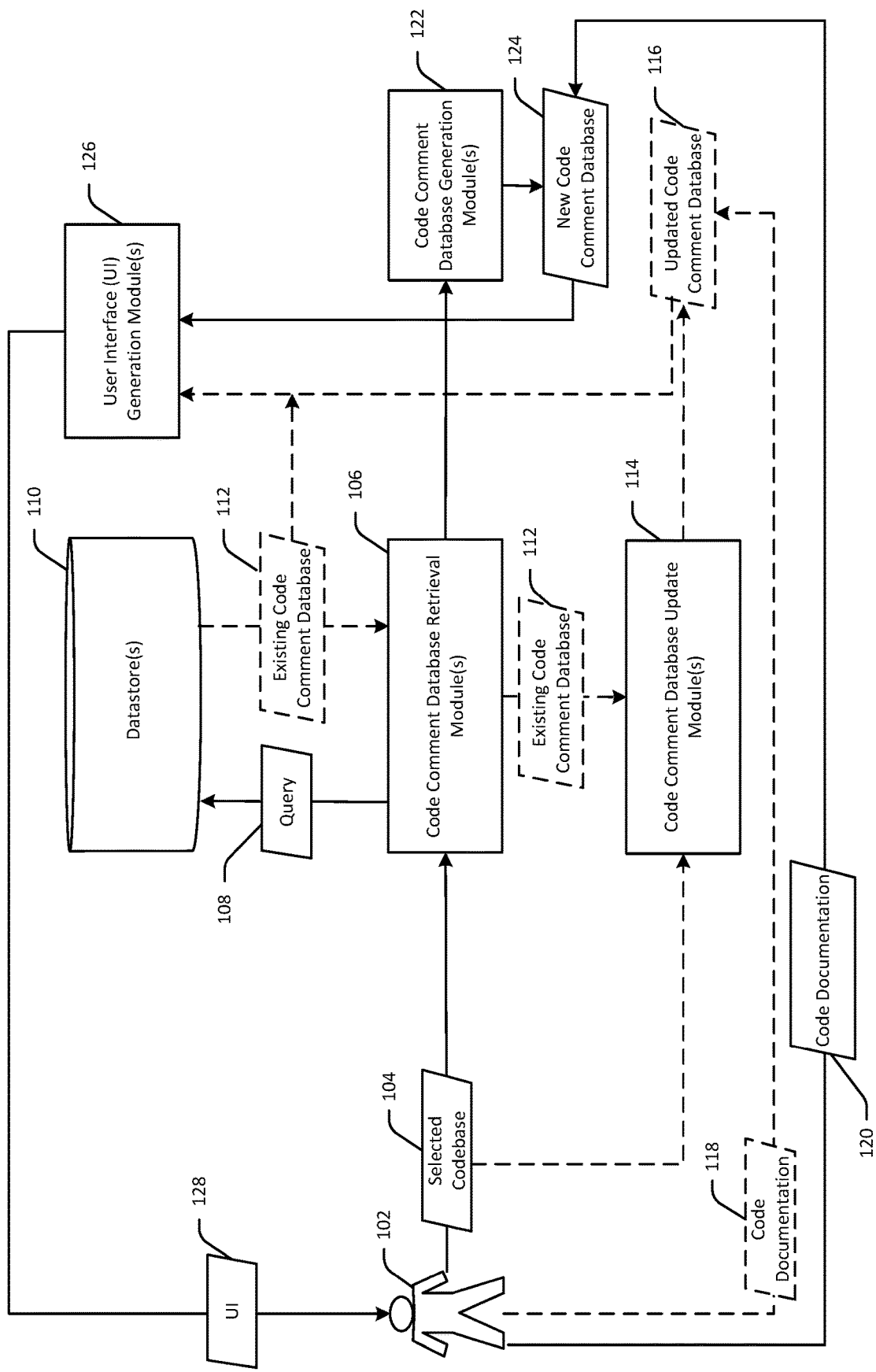
FIG. 1 is a schematic hybrid data flow/block diagram illustrating code comment database generation/maintenance in accordance with one or more example embodiments.

Example embodiments relate to, among other things, systems, methods, computer-readable media, techniques, and methodologies for external storage and organization of documentation for computer-executable source code. In example embodiments, an executable program is provided that receives a selected codebase as input and generates a code comment database corresponding thereto that provides a structured framework for documenting the codebase. In particular, in example embodiments, upon receiving a selected codebase as input, the executable program checks for an existing comment code database for the selected codebase. If no existing database is found, the executable program can generate a code comment database for the selected codebase, as described above. On the other hand, in example embodiments, if an existing code comment database is located, the executable program may prompt a user as to whether the user would like for a scan for new/updated code to be performed. If the user indicates that the scan should be performed, the executable program scans the codebase for any new and/or updated structures in the code base. If a new structure is found, the executable program generates a corresponding new database entry for the structure and updates the existing code comment database with the new entry. Similarly, if an update to an existing structure in the codebase is identified, the executable program may update the corresponding database entry accordingly. Once the scan and corresponding modifications to the code comment database are complete, the user may be provided with access to the code comment database. In example embodiments, if the user declines the scan for new/updated code, the user may be directly provided with access to the code comment database. As used herein, the term structure may include a class, a function, an argument, a variable, or the like. Further, in example embodiments, the executable program provides a user with the capability to add and/or edit comments for each structure represented in a code comment database.

In example embodiments, a user can access and navigate through a code comment database via one or more user interfaces. More specifically, in example embodiments, a default view of a user interface for navigating a code comment database includes an indication of a first function (e.g., a root function) in a nested hierarchy of functions specified in the corresponding codebase. For instance, the root function may be an entry point where execution of the codebase begins. The root function may be a conventional name defined by the programming language or the operating system or a caller-specified name. In many programming languages, the entry point is a 'main' function (e.g., C, C++, C #, etc.). Although example embodiments are described herein in reference to a nested hierarchy of functions that includes a root function, it should be appreciated that in other example embodiments, there may be no root function, or when viewed from a different perspective, there may be multiple root functions (e.g., multiple functions located at a top-most tier in a nested hierarchy of functions). For example, if the codebase is an Application Programming Interface (API), there may be multiple root functions. In such example embodiments, the UI for navigating the code comment database corresponding to such a codebase may display multiple root level functions or prompt the user to identify an entry point function.

In example embodiments, a selectable indicia (e.g., a selectable icon) is displayed in association with the root function. Selection of this selectable indicia may result in an expanded view of the underlying structure of the root function being displayed. More specifically, in example embodiments, the expanded view includes an indication of one or more arguments that the root function takes; one or more variables defined by the root function; and/or one or more functions called by the root function. In example embodiments, a respective selectable indicia associated with each such function called by the root function is also displayed. When a selectable indicia corresponding to a nested function is selected, a further expanded view may be displayed in the user interface for the nested function. This expanded view may similarly include an indication of one or more arguments that the nested function takes; one or more variables defined by the nested function; and/or one or more functions called by the nested function (if any). If a nested function calls another function in the nested hierarchy of functions, an expanded view of the called function can be accessed in a similar manner as described above. Thus, in example embodiments, a user interface for navigating a code comment database provides a user with a visual representation of the nested hierarchy of functions defined in a codebase as well as an indication of arguments, variables, etc. associated with each function.

In example embodiments, documentation (e.g., note, annotations, documentation comments, etc.) associated with a function is displayed in conjunction with the visual representation of the nested hierarchy of functions. For instance, in example embodiments, a first pane or window may display the representation of the nested function hierarchy, while a second pane or window may display documentation corresponding to a selected function from the first pane or window. Further, in example embodiments, a selection in the first pane of a particular argument, variable, or the like of a given function results in documentation corresponding to the selected argument, variable, or the like being highlighted or otherwise emphasized in the second pane. In this manner, a user can be directed to relevant documentation in the second pane corresponding to a selection made in the first pane.

Example embodiments provide various technical features, technical effects, and/or improvements to computer technology. Specifically, example embodiments relate to a framework for externally storing and organizing code documentation relating to source code in the form of a code comment database. Example embodiments provide the technical effects of enabling access to and modification of a code comment database without requiring any changes to the underlying source code and without requiring the comments to be in a specific format.

Conventionally, code comments are inserted directly into the source code, and as a result, it is not possible to edit the comments without accessing and changing the source code. Thus, with conventional code comments that are inserted directly into the source code, edits to the comments often require re-compiling the code. In addition, inserting comments directly into the source code presents a risk of inadvertently altering the functionality of the code itself.

Further, conventional comment managers require comments inserted in the source code to be formatted in accordance with a specific format. As such, using such comment managers in connection with existing codebases that include comments formatted differently from the specific format dictated by the comment managers is cumbersome. Example embodiments alleviate these technical problems by providing a technical solution that enables generating and modifying code documentation externally from the source code to which it corresponds and without modifying the source code itself and without requiring the code documentation to be formatted in a specific way.

In addition, example embodiments provide a user interface that enables a user to navigate the code comment database corresponding to a selected codebase. The user interface provides a visual representation of a nested hierarchy of functions specified in the codebase that includes an indication of arguments, variables, called functions, and the like associated with each function in the hierarchy. In example embodiments, this visual representation is presented in conjunction with code documentation detailing the function/purpose of functions in the codebase and their corresponding arguments, variables, or the like. Thus, a user interface for navigating a code comment database in accordance with example embodiments provides a technical effect over conventional mechanisms for commenting on code by providing an improved mechanism that allows a user to visualize the nested hierarchy of functions in a codebase, navigate to a particular function (or a particular variable or argument of the function), and modify any related code documentation without having to access the underlying code.

In addition, example embodiments relate to an executable program that is configured to automatically scan a codebase for any new structures and generate new entries in a code comment database corresponding to the new structures and/or scan for updated structures and update corresponding entries in the code comment database. In this manner, the visual representation of the nested hierarchy is automatically updated to reflect any changes to the structure of the underlying codebase that it represents. As such, example embodiments of the invention constitute a technical improvement to computer technology, specifically an improvement to computer-based technology for providing code documentation. Example embodiments also provide an improvement to computer-based code documentation technology by providing a graphical representation of the underlying structure of a codebase that enables a user to visualize the structure of the codebase with ease.

An illustrative method in accordance with example embodiments of the invention and corresponding data structures (e.g., program modules) for performing the method will now be described. It should be noted that each operation of the method 200 may be performed by one or more of the program modules or the like depicted in FIG. 1 or FIG. 5, whose operation will be described in more detail hereinafter. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Figure 2:
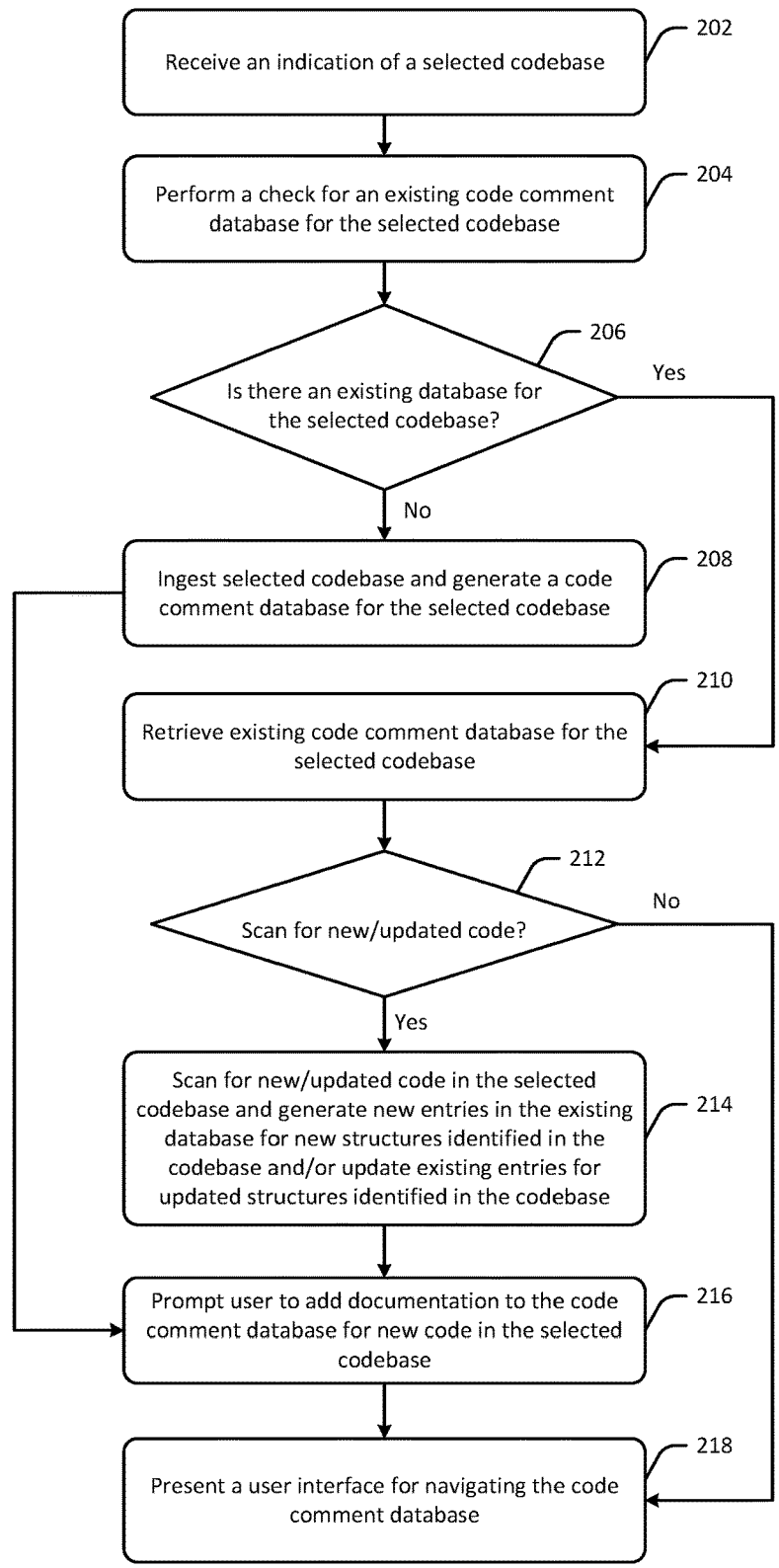
FIG. 2 is a process flow diagram of an illustrative method for generating a new code comment database or updating an existing code comment database in accordance with one or more example embodiments.

FIG. 1 is a schematic hybrid data flow/block diagram illustrating code comment database generation/maintenance in accordance with one or more example embodiments. FIG. 2 is a process flow diagram of an illustrative method 200 for generating a new code comment database or updating an existing code comment database in accordance with one or more example embodiments. FIGS. 1 and 2 will be described hereinafter in conjunction with one another.

At block 202 of the method 200, an executable program for generating/updating a code comment database in accordance with example embodiments of the invention may receive an indication of a selected codebase 104 from a user 102. More specifically, one or more code comment database retrieval modules 106 of the executable program may receive the indication of the codebase 104. In example embodiments, the user 102 may select the codebase 104 from a group of available codebases. It should be appreciated that the various program modules depicted in FIG. 1 may form part of the executable code comment generation/update program described herein in accordance with example embodiments.

Figure 3A:
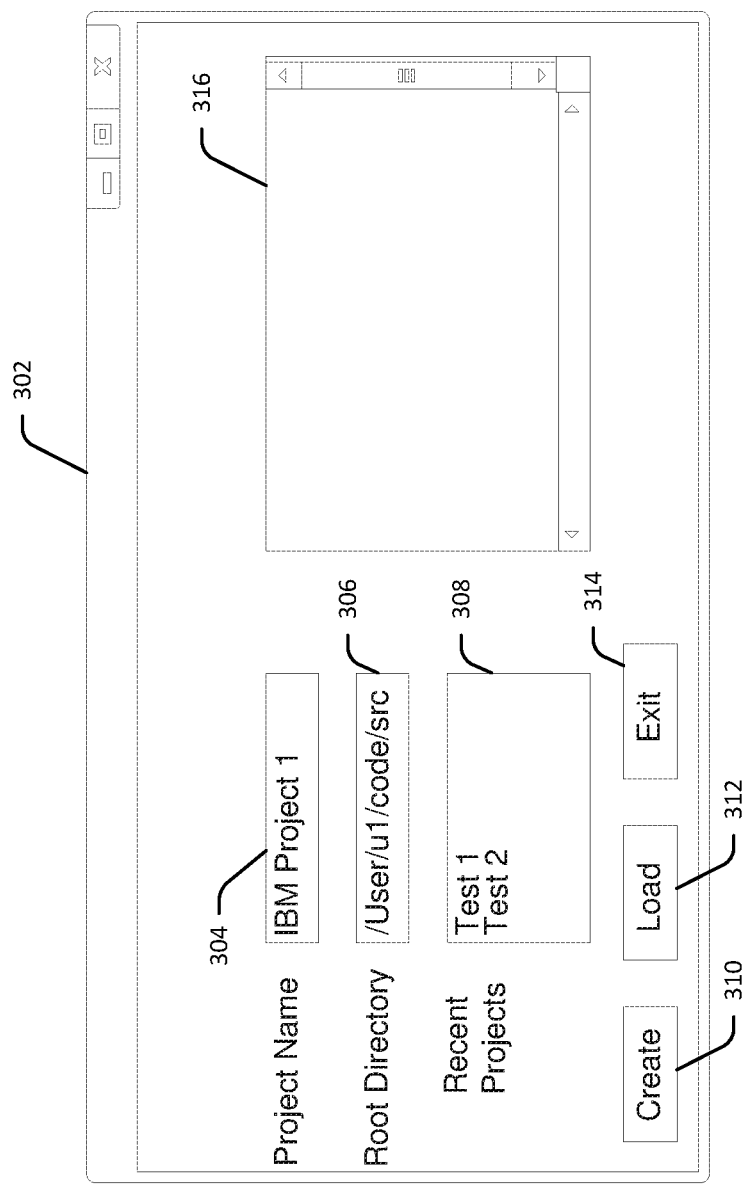
FIGS. 3A and 3B depict an example user interface (UI) for specifying a codebase for generation of a new code comment database or updating an existing code comment database in accordance with one or more example embodiments.
Figure 3B:
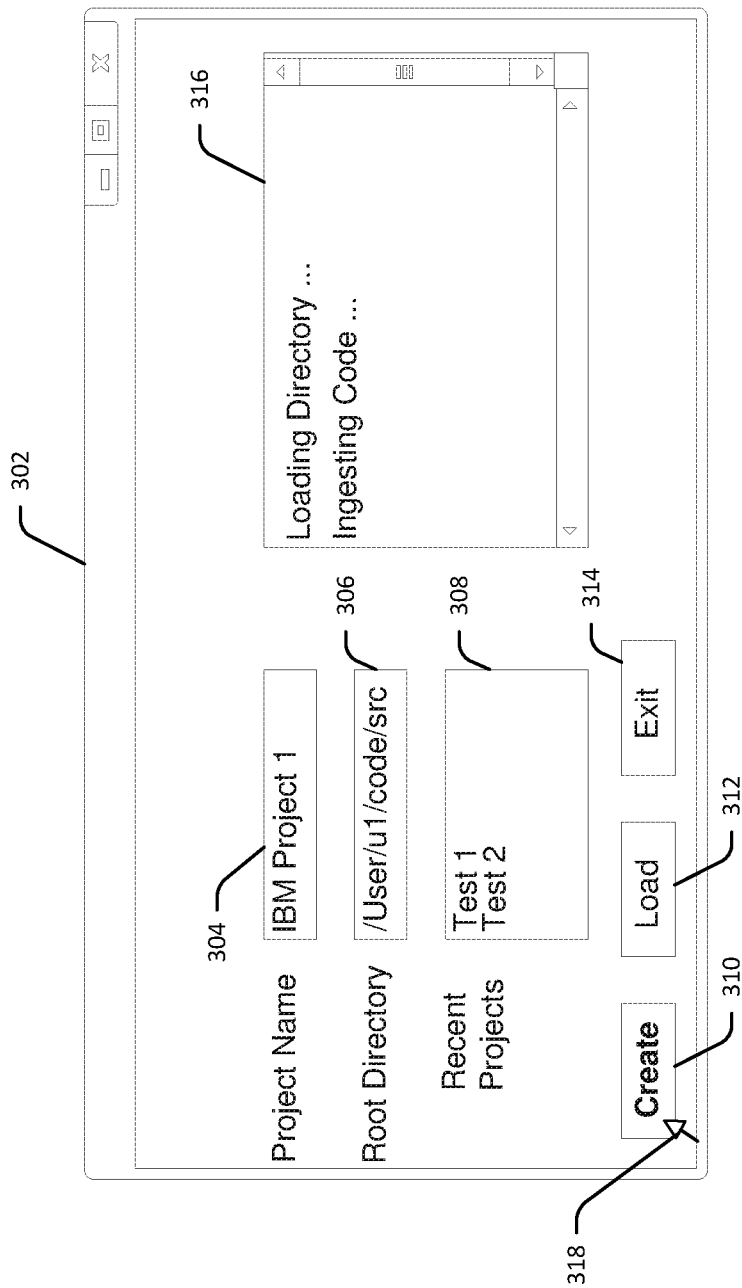

FIGS. 3A and 3B depict an example user interface (UI) for specifying a codebase based on which a new code comment database is generated or an existing code comment database is updated in accordance with one or more example embodiments. As depicted in FIG. 3A, the executable program may present a UI 302 (e.g., a window, dialog box, or the like) to the user 102. The UI 302 may include a field 304 in which the user 102 can provide input text specifying a project name for the code comment database to be generated/updated. The UI 302 may also include a field 306 in which the user 102 can specify a source (e.g., a filepath) for retrieving the codebase 104. The UI 302 may further include a selectable button, icon, or the like 310 for generating a new code comment database for the codebase 104 whose source is specified in the field 306. In addition, the UI 302 may include a button, icon, or the like 314 for exiting out of the executable code comment database generation/update program.

The UI 302 may additionally include a field 308 that identifies recent projects that have been accessed. The user 102 can select a recent project from those identified in the field 308 and select a button, icon, or the like 312 to load an existing code comment database corresponding to the selected project. In certain example embodiments, even if the user 102 selects an existing project from the field 308, the user 102 may nonetheless specify a source for the corresponding codebase in the field 306 if, for example, the codebase has been altered and the code comment database for the codebase needs to be updated based on the codebase alterations.

At block 204 of the method 200, in example embodiments, computer-executable instructions of the code comment database retrieval module(s) 106 are executed to perform a check for an existing code comment database corresponding to the selected codebase 104. To perform the check at block 204, the code comment database retrieval module(s) 106 may submit a query 108 to one or more datastore(s) 110. The response to the query 108 may be an existing code comment database 112 (if one exists) for the selected codebase 104 or a response indicating that there is no existing code comment database 112 for the selected codebase 104.

In example embodiments, if the user 102 selects a recent project from the field 308 (or specifies the name of an existing project in the field 304) and then selects the button/icon 312, the code comment database retrieval module(s) 106 may perform the check at block 204 in response thereto, the result of which may be the retrieval of the corresponding existing code comment database 112. In such example embodiments, the code comment database retrieval module(s) 106 may be able to retrieve the existing code comment database 112 regardless of whether the user 102 specifies a file source of the codebase 104 in the field 306 based, for example, on a stored association between the project name, the code comment database 112, and the corresponding codebase 104. In certain other example embodiments, even if the user 102 selects the button/icon 310 to create a new code comment database, the code comment database retrieval module(s) 106 may nonetheless perform the check at block 204 to determine whether there is an existing code comment database for the specified codebase 104. If an existing code comment database is located, the user 102 may be presented with a UI to navigate and view/edit information in the existing code comment database. In example embodiments, a documentation file may be stored in the root directory of the source. The documentation file can include a feature/attribute that identifies the corresponding code comment database or could be the code comment database itself.

At block 206 of the method 200, in example embodiments, the code comment database retrieval module(s) 106 determine whether there is an existing code comment database 112 for the codebase 104 based, for example, on the response received to its query 108. In response to a positive determination at block 206, in example embodiments, the code comment database retrieval module(s) 106 may retrieve the existing code comment database 112 from the datastore(s) 110, and at block 212 of the method 200, the executable code comment database generation/update program may prompt the user 102 for input indicating whether a scan of the codebase should be performed for new/updated code. If the user 102 indicates that the scan should be performed (i.e., a positive determination at block 212), and the code comment database retrieval module(s) 106 may provide the existing code comment database 112 as input to one or more code comment database update modules 114.

Then, at block 214 of the method 200, in example embodiments, computer-executable instructions of the code comment database update module(s) 114 are executed to scan for new or updated code in the codebase 104 and generate new entries in the existing code comment database 112 for any new structures identified in the codebase 104 or update existing entries in the code comment database 112 for any updated structures identified in the codebase 104. In example embodiments, the result of the operation at block 214 is an updated code comment database 116 for the codebase 104. Alternatively, if the user 102 does not select for the scan to be performed, the method 200 proceed from block 212 directly to block 218, where a user interface for accessing and navigating the code comment database 112 is presented to the user 102. In example embodiments, the user 102 may opt against performing the scan because the user 102 does not wish to have the latest code ingested before viewing the documentation. In addition, because the code comment database stores the code documentation externally from the source code itself, the code comment database can be accessed even if the source code is stored on a different system. While the illustrative method 200 is described in connection with prompting the user 102 to make a selection as to whether to perform a scan for new/updated code, in certain example embodiments, the default behavior may be to present the user 102 with the UI for accessing and navigating the code comment database, and within the UI, providing the user 102 with the capability to update the code comment database.

As previously noted, new structures identified in the codebase 104 can include, for example, a new class definition, a new function, a new argument received by a function, a new variable definition, or the like. Data flows corresponding to the 'yes' path from block 206 and the subsequent operations at blocks 210, 212, and 214 are illustrated in FIG. 1 using dashed lines to indicate that these are alternative paths that are followed when the existing code comment database 112 is present as opposed to a path that is followed when the existing code comment database 112 is not present and a new code comment database needs to be generated.

Referring again to block 206, in example embodiments, in response to a negative determination indicating that an existing code comment database is not present, computer-executable instructions of one or more code comment database generation modules 122 are executed are block 208 of the method 200 to ingest the codebase 104 and generate a new code comment database 124 corresponding to the codebase 104. In example embodiments, generating the new code comment database 124 includes determining a hierarchy of functions in the codebase 104 as well as arguments, variables, called functions, and so forth for each function, and generating database entries in the new code comment database 124 corresponding to the structures identified in the codebase 104. In example embodiments, a negative determination is made at block 206 in response to a user selection 318 of the button/icon 310 to create a new code comment database, as depicted in FIG. 3B. However, as previously noted, in example embodiments, the code comment database retrieval module(s) 106 may still perform the check at block 204 even if the user 102 makes the selection 318 to generate a new code comment database. Further, in example embodiments, as the code comment database generation module(s) 122 are ingesting the codebase 104 and generating the new code comment database 124, an indication of this processing may be presented to the user in a window 316 of the US 302, as depicted in FIG. 3B.

From both block 208 and block 214, the method proceeds to block 216, where the executable program prompts the user 102 to add code documentation to the code comment database. More specifically, in example embodiments, if the method proceeds to block 216 from block 208, the user 102 is prompted to add code documentation 120 to the new code comment database 124 generated for the codebase 104. The code documentation 120 may include documentation describing the function/purpose of functions, arguments, variables, etc. in the codebase 104 that are represented by corresponding entries in the new code comment database 124. On the other hand, in example embodiments, if the method proceeds to block 216 from block 214, the user 102 is prompted for code documentation 118 to include in the updated code comment database 116. The code documentation 118 may include new documentation corresponding to new structures identified from the scan performed at block 212 or edits to existing documentation that was already present in the existing code comment database 112.

Figure 4A:
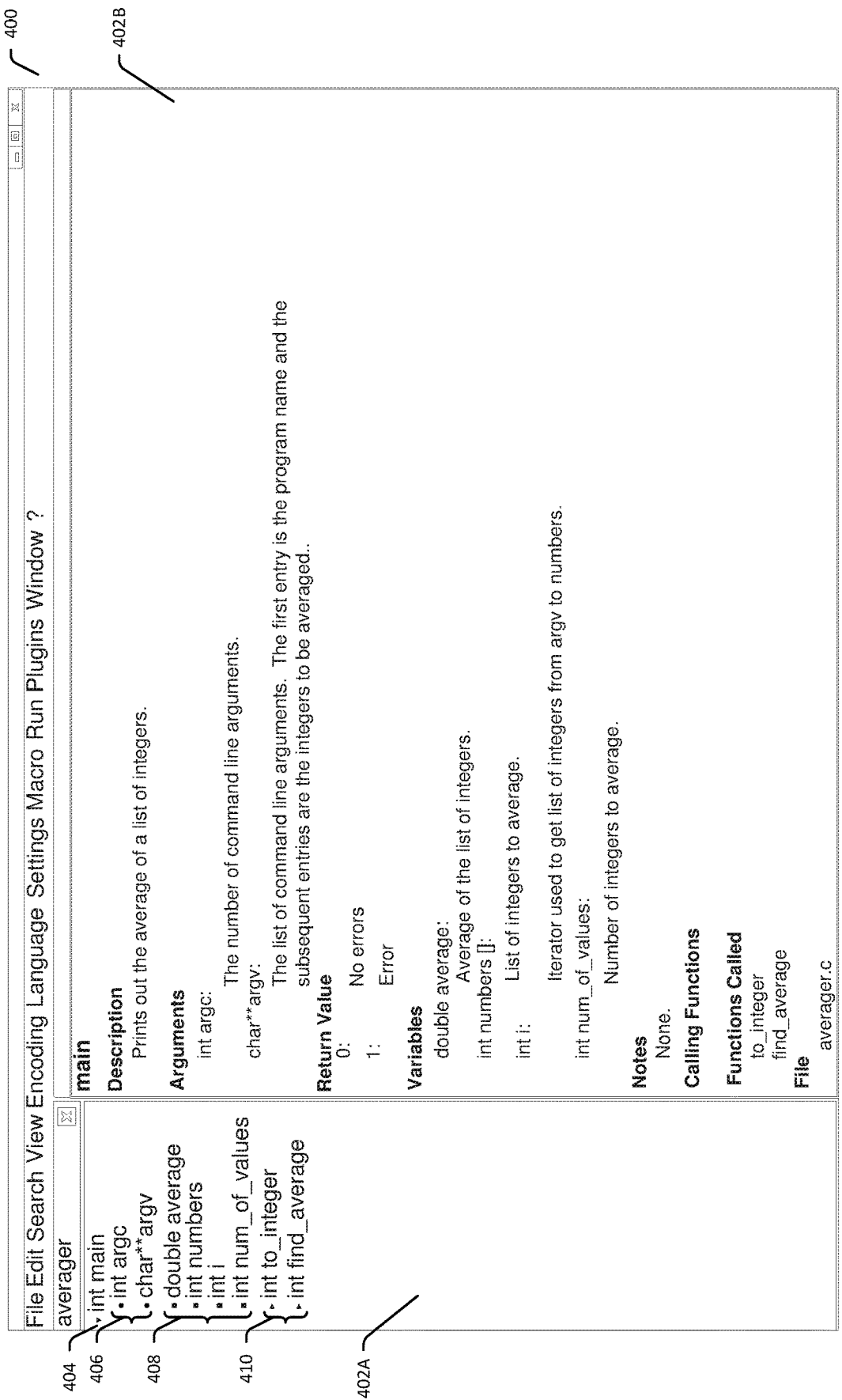
Figure 4C:
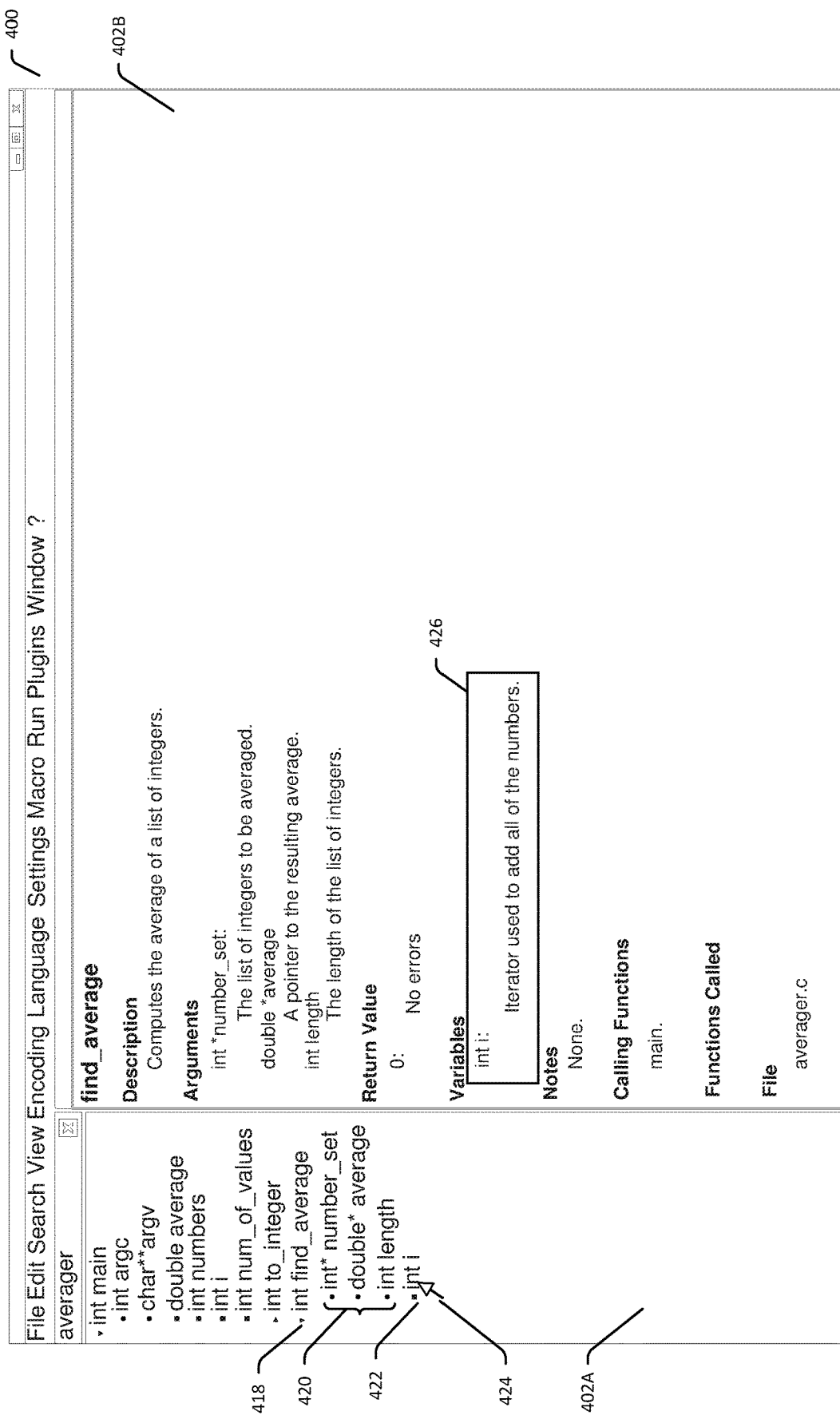

At block 218 of the method 200, in example embodiments, computer-executable instructions of one or more UI generation modules 126 are executed to present to the user 102 a UI 128 for navigating the updated code comment database 116 or the new code comment database 124, whichever the case may be. FIGS. 4A, 4B, and 4C depict an example UI 400 (e.g., an example implementation of the UI 128) for displaying and enabling navigation of a code comment database in accordance with one or more example embodiments.

Example computer-executable code that serves as the basis for the example code comment database visually represented in the UI 400 depicted in FIGS. 4A-4C is shown below. The example computer-executable code below may form at least part of the codebase 104 in example embodiments.

```
#include <stdio.h>
#include <string.h>
#include <math.h>
int main(int argc, char **argv) {
   double average = 0;
   int numbers[argc - 1];
   int i = 0;
   int num_of_values = argc-1;
   bzero(numbers, sizeof(numbers));
   for (i = 1; i <= num_of_values; i++) {
      if (to_integer(*(argv + i), &numbers[i - 1])) {
         printf("Invalid input.\n");
         return 1;
      }
   }
   if (find_average(numbers, &average, num_of_values)) {
      printf("what you've done is impossible.\n");
      return 1;
   }
   printf("The average of the given numbers is: %g\n", average);
}
int to_integer(char *str, int *number) {
   int i = 0;
   char current_character = '0';
   int current_number = 0;
   int string_length = strlen(str);
   double max_size = 0;
   max_size = pow(10, string_length + 1);
   if (max_size != (int) max_size) {
      return -1;
   }
   for (i = 0; i < string_length; i++) {
      current_character = *(str + i);
      current_number = current_character - '0';
      if (current_number > 9 || current_number <0) {
         return -1;
      }
      *number = *number * 10;
      *number += current_number;
   }
   return 0;
}
int find_average (int *number_set, double *average, int length) {
   int i = 0;
   bzero(average, sizeof(average));
   for (i = 0; i < length; i++) {
      *average += *(number_set + i);
   }
   *average = *average / length;
   return 0;
}
```

Referring first to FIG. 4A, the example UI 400 for viewing/navigating the code comment database corresponding to the example executable code above may include a visual representation of a nested hierarchy of functions in the code in a first window/pane 402A of the UI 400. In example embodiments, an expanded view of a root function in the code (e.g., a 'main' function) may be presented as part of a default view of the visual representation of the nested hierarchy of functions. In other example embodiments, the default view may be a fully condensed view, in which case, a selectable indicia 404 can be selected by the user 102 to cause the expanded view for the root function to be displayed, as shown in FIG. 4A. The expanded view for the root function may include an indication 406 of arguments that the root function takes, an indication 408 of variables defined in the root function, and an indication 410 of functions called by the root function. Different indicia may be used to differentiate the arguments, variables, and called functions in the visual representation of the nested hierarchy of functions. In example embodiments, code documentation corresponding to the root function may be displayed in a second window/pane 402B of the UI 400. In example embodiments, the code documentation for the root function shown in FIG. 4A may be presented in the window/pane 402B as part of the default view or may be presented responsive to user selection of the indicia 404 that causes the expanded view of the root function to be displayed in the window/pane 402A. As previously noted, in example embodiments, no root function may be present or multiple root functions may be present. If multiple root functions are present, each such root function may be initially presented in the window/pane 402A in a default condensed view.

Referring now to FIG. 4B, an expanded view of a function (e.g., the "to_integer" function) called by the root function (e.g., the "main" function) is presented in the window/pane 402A. In particular, in example embodiments, the functions called by the root function may initially be displayed in the window/pane 402A in a condensed view. User selection of a selectable indicia 412 associated with a called function (e.g., the "to_integer" function) causes an expanded view of the called function to be presented as part of the visual representation of the nested hierarchy of functions. This expanded view may include an indication 414 of arguments received by the called function as well as an indication 416 of variables defined in the called function.

Similarly, as depicted in FIG. 4C, an expanded view of another function (e.g., the "find_average" function) called by the root function (e.g., the "main" function) is presented in the window/pane 402A. In particular, in example embodiments, the "find_average" function called by the root "main" function may initially be displayed in the window/pane 402A in a condensed view. User selection of a selectable indicia 418 associated with a called function (e.g., the "find_average" function) causes an expanded view of the called function to be presented as part of the visual representation of the nested hierarchy of functions. This expanded view may include an indication 420 of arguments received by the called function as well as an indication 422 of variables defined in the called function.

While the example executable code represented by the code comment database visually depicted in the UI 400 includes only two functions called by the root function, it should be appreciated that the codebase 104 may include any number of root functions (including no root functions) and any number of functions that are called by the root function(s). In addition, any called function may itself call any number of additional functions. Thus, the nested hierarchy of functions in the codebase 104 may include any number of levels of called functions. As such, the visual representation of the nested hierarchy of functions that is displayed in the window/pane 402A may provide the capability to generate an expanded view of any function at any level in the hierarchy via selection of a corresponding selectable indicia. It should be appreciated that the visual representation of the nested hierarchy of functions may be displayed in any number of states in which all functions are displayed in the condensed view; all functions are displayed in the expanded view; or one or more functions are displayed in the expanded view and one or more functions are displayed in the condensed view.

In example embodiments, the code documentation displayed in the window/pane 402B for a given function is directly editable by the user 102 within the window/pane 402B. In addition, in example embodiments, a user selection 424 of a particular argument or variable displayed as part of the expanded view of a function in the visual representation displayed in the window/pane 402A (or a user selection 424 of a selectable indicia associated with such an argument or variable) may cause a portion of the code documentation 426 corresponding to the selected variable/argument to be highlighted or otherwise conspicuously displayed in relation to the other code documentation for the function. In this manner, a user 102 can directly navigate to the relevant code documentation for any structure defined in a function of the nested hierarchy of functions.

In example embodiments, when a selectable indicia associated with a function is selected to cause an expanded view of the function to be presented as part of the visual representation of the nested hierarchy of functions displayed in the window/pane 402A, code documentation corresponding to the function may automatically be displayed in the window/pane 402B. Alternatively, in example embodiments, the name of a function itself may be selectable in the visual representation of the nested hierarchy of functions to cause the corresponding code documentation for that function to be displayed in the window/pane 402B. Thus, in such example alternative embodiments, a selectable indicia associated with a function (e.g., the selectable indicia 412 or 418) need not be selected (and the expanded view of the function need not be displayed in the window/pane 402A) to cause the corresponding code documentation for that function to be displayed in the window/pane 402B.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 5:
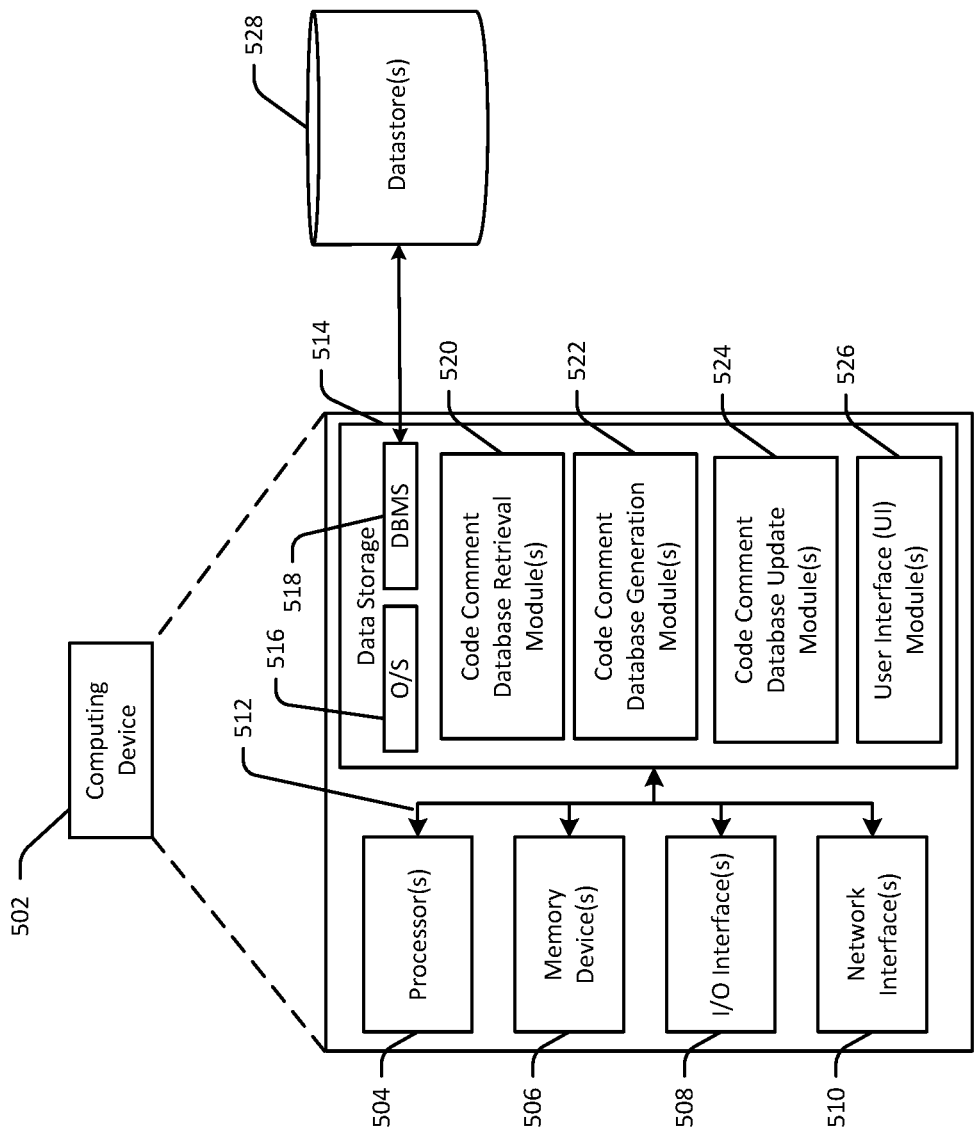
FIG. 5 is a schematic diagram of an illustrative computing device configured to implement one or more example embodiments.

FIG. 5 is a schematic diagram of an illustrative computing device 502 configured to implement one or more example embodiments of the disclosure. The computing device 502 may be any suitable device including, without limitation, a server, a personal computer (PC), a tablet, a smartphone, a wearable device, a voice-enabled device, or the like. While any particular component of the computing device 502 may be described herein in the singular, it should be appreciated that multiple instances of any such component may be provided, and functionality described in connection with a particular component may be distributed across multiple ones of such a component.

Although not depicted in FIG. 5, the computing device 502 may be configured to communicate with one or more other devices, systems, datastores, or the like via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 502 may include one or more processors (processor(s)) 504, one or more memory devices 506 (generically referred to herein as memory 506), one or more input/output ("I/O") interface(s) 508, one or more network interfaces 510, and data storage 514. The computing device 502 may further include one or more buses 512 that functionally couple various components of the computing device 502.

The bus(es) 512 may include at least one of a system bus, a memory bus, an address bus, or a message bus, and may permit the exchange of information (e.g., data (including computer-executable code), signaling, etc.) between various components of the computing device 502. The bus(es) 512 may include, without limitation, a memory bus or a memory controller, a peripheral bus, an accelerated graphics port, and so forth. The bus(es) 512 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 506 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 506 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 506 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 514 may include removable storage and/or non-removable storage including, but not limited to, magnetic storage, optical disk storage, and/or tape storage. The data storage 514 may provide non-volatile storage of computer-executable instructions and other data. The memory 506 and the data storage 514, removable and/or non-removable, are examples of computer-readable storage media (CRSM) as that term is used herein.

The data storage 514 may store computer-executable code, instructions, or the like that may be loadable into the memory 506 and executable by the processor(s) 504 to cause the processor(s) 504 to perform or initiate various operations. The data storage 514 may additionally store data that may be copied to memory 506 for use by the processor(s) 504 during the execution of the computer-executable instructions. Moreover, output data generated as a result of execution of the computer-executable instructions by the processor(s) 504 may be stored initially in memory 506 and may ultimately be copied to data storage 514 for non-volatile storage.

More specifically, the data storage 514 may store one or more operating systems (O/S) 516; one or more database management systems (DBMS) 518 configured to access the memory 506 and/or one or more external datastores 528; and one or more program modules, applications, engines, managers, computer-executable code, scripts, or the like such as, for example, one or more code comment database retrieval modules 520; one or more code comment database generation modules 522; one or more code comment database update modules 524; and one or more user interface (UI) modules 526. Any of the components depicted as being stored in data storage 514 may include any combination of software, firmware, and/or hardware. The software and/or firmware may include computer-executable instructions (e.g., computer-executable program code) that may be loaded into the memory 506 for execution by one or more of the processor(s) 504 to perform any of the operations described earlier in connection with correspondingly named modules.

Although not depicted in FIG. 5, the data storage 514 may further store various types of data utilized by components of the computing device 502 (e.g., data stored in the datastore(s) 528). Any data stored in the data storage 514 may be loaded into the memory 506 for use by the processor(s) 504 in executing computer-executable instructions. In addition, any data stored in the data storage 514 may potentially be stored in the external datastore(s) 528 and may be accessed via the DBMS 518 and loaded in the memory 506 for use by the processor(s) 504 in executing computer-executable instructions.

The processor(s) 504 may be configured to access the memory 506 and execute computer-executable instructions loaded therein. For example, the processor(s) 504 may be configured to execute computer-executable instructions of the various program modules, applications, engines, managers, or the like of the computing device 502 to cause or facilitate various operations to be performed in accordance with one or more embodiments of the disclosure. The processor(s) 504 may include any suitable processing unit capable of accepting data as input, processing the input data in accordance with stored computer-executable instructions, and generating output data. The processor(s) 504 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 504 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 504 may be capable of supporting any of a variety of instruction sets.

Referring now to other illustrative components depicted as being stored in the data storage 514, the O/S 516 may be loaded from the data storage 514 into the memory 506 and may provide an interface between other application software executing on the computing device 502 and hardware resources of the computing device 502. More specifically, the O/S 516 may include a set of computer-executable instructions for managing hardware resources of the computing device 502 and for providing common services to other application programs. In certain example embodiments, the O/S 516 may include or otherwise control the execution of one or more of the program modules, engines, managers, or the like depicted as being stored in the data storage 514. The O/S 516 may include any operating system now known or which may be developed in the future including, but not limited to, any server operating system, any mainframe operating system, or any other proprietary or non-proprietary operating system.

The DBMS 518 may be loaded into the memory 506 and may support functionality for accessing, retrieving, storing, and/or manipulating data stored in the memory 506, data stored in the data storage 514, and/or data stored in external datastore(s) 528. The DBMS 518 may use any of a variety of database models (e.g., relational model, object model, etc.) and may support any of a variety of query languages. The DBMS 518 may access data represented in one or more data schemas and stored in any suitable data repository. Data stored in the datastore(s) 528 may include, for example, code comment databases; codebases; and so forth. External datastore(s) 528 that may be accessible by the computing device 502 via the DBMS 518 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 502, the input/output (I/O) interface(s) 508 may facilitate the receipt of input information by the computing device 502 from one or more I/O devices as well as the output of information from the computing device 502 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 502 or may be separate. The I/O devices may further include, for example, any number of peripheral devices such as data storage devices, printing devices, and so forth.

The I/O interface(s) 508 may also include an interface for an external peripheral device connection such as universal serial bus (USB), FireWire, Thunderbolt, Ethernet port or other connection protocol that may connect to one or more networks. The I/O interface(s) 508 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 502 may further include one or more network interfaces 510 via which the computing device 502 may communicate with any of a variety of other systems, platforms, networks, devices, and so forth. The network interface(s) 510 may enable communication, for example, with one or more other devices via one or more of the network(s).

It should be appreciated that the program modules/engines depicted in FIG. 5 as being stored in the data storage 514 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the computing device 502 and/or other computing devices accessible via one or more networks, may be provided to support functionality provided by the modules depicted in FIG. 5 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 5 may be implemented, at least partially, in hardware and/or firmware across any number of devices.

It should further be appreciated that the computing device 502 may include alternate and/or additional hardware, software, or firmware components beyond those described or depicted without departing from the scope of the disclosure. More particularly, it should be appreciated that software, firmware, or hardware components depicted as forming part of the computing device 502 are merely illustrative and that some components may not be present or additional components may be provided in various embodiments. While various illustrative modules have been depicted and described as software modules stored in data storage 514, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations the method 200 may be performed by a computing device 502 having the illustrative configuration depicted in FIG. 5, or more specifically, by one or more program modules, engines, applications, or the like executable on such a device. It should be appreciated, however, that such operations may be implemented in connection with numerous other device configurations.

The operations described and depicted in the illustrative methods of FIG. 2 may be carried out or performed in any suitable order as desired in various exemplary embodiments of the disclosure. Additionally, in certain example embodiments, at least a portion of the operations may be carried out in parallel. Furthermore, in certain example embodiments, less, more, or different operations than those depicted in FIG. 2 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for external storage and organization of documentation for computer-executable source code, the method comprising:
    receiving, from a user, an indication of a selected codebase;
    determining that a code comment database does not exist for the selected codebase;
    generating a new code comment database for the selected codebase;
    presenting, to the user, a user interface for navigating the new code comment database;
    prompting the user for code documentation; and
    inserting the code documentation into the new code comment database.

2. The computer-implemented method of claim 1, wherein the selected codebase is a first selected codebase, the method further comprising:
    receiving, from the user, an indication of a second selected codebase;
    retrieving an existing code comment database for the second selected codebase; and
        presenting, to the user, a user interface for navigating the existing code comment database.

3. The computer-implemented method of claim 2, further comprising:
    scanning the second selected codebase to identify new structures in the second selected codebase;
    generating new database entries corresponding to the new structures in the second selected codebase; and
    updating the existing code comment database to include the new database entries.

4. The computer-implemented method of claim 1, wherein the user interface comprises an indication of a first function in a nested hierarchy of functions and a first selectable indicia associated with the indication of the first function, the method further comprising:
    receiving, from the user, a selection of the first selectable indicia; and
    displaying, in the user interface, a representation of a structure of the first function, the representation of the structure of the first function comprising i) an indication of one or more arguments of the first function, ii) an indication of one or more variables defined in the first function, and iii) an indication of one or more additional functions in the nested hierarchy of functions that are called by the first function.

5. The computer-implemented method of claim 4, further comprising displaying, in the user interface, code documentation corresponding to at least one of: i) the arguments of the first function, ii) the variables defined in the first function, or iii) the one or more additional functions in the nested hierarchy of functions.

6. The computer-implemented method of claim 4, wherein the selectable indicia is a first selectable indicia, the method further comprising:
displaying, in the user interface, a second indicia in association with a second function of the one or more additional functions in the nested hierarchy of functions;
receiving, from the user, a selection of the second indicia; and
displaying, in the user interface, a representation of a structure of the second function.

7. A system for external storage and organization of documentation for computer-executable source code, the system comprising:
at least one memory storing computer-executable instructions; and
at least one processor of a sending device, wherein the at least one processor is configured to access the at least one memory and execute the computer-executable instructions to:
receive, from a user, an indication of a selected codebase;
determine that a code comment database does not exist for the selected codebase;
generate a new code comment database for the selected codebase;
present, to the user, a user interface for navigating the new code comment database;
prompt the user for code documentation; and
insert the code documentation into the new code comment database.

8. The system of claim 7, wherein the selected codebase is a first selected codebase, and wherein the at least one processor is further configured to execute the computer-executable instructions to:
receive, from the user, an indication of a second selected codebase;
retrieve an existing code comment database for the second selected codebase; and
present, to the user, a user interface for navigating the existing code comment database.

9. The system of claim 8, wherein the at least one processor is further configured to execute the computer-executable instructions to:
scan the second selected codebase to identify new structures in the second selected codebase;
generate new database entries corresponding to the new structures in the second selected codebase; and
update the existing code comment database to include the new database entries.

10. The system of claim 7, wherein the user interface comprises an indication of a first function in a nested hierarchy of functions and a first selectable indicia associated with the indication of the first function, and wherein the at least one processor is further configured to execute the computer-executable instructions to:
receive, from the user, a selection of the first selectable indicia; and
display, in the user interface, a representation of a structure of the first function, the representation of the structure of the first function comprising i) an indication of one or more arguments of the first function, ii) an indication of one or more variables defined in the first function, and iii) an indication of one or more additional functions in the nested hierarchy of functions that are called by the first function.

11. The system of claim 10, wherein the at least one processor is further configured to execute the computer-executable instructions to display, in the user interface, code documentation corresponding to at least one of: i) the arguments of the first function, ii) the variables defined in the first function, or iii) the one or more additional functions in the nested hierarchy of functions.

12. The system of claim 10, wherein the selectable indicia is a first selectable indicia, and wherein the at least one processor is further configured to execute the computer-executable instructions to:
display, in the user interface, a second indicia in association with a second function of the one or more additional functions in the nested hierarchy of functions;
receive, from the user, a selection of the second indicia; and
display, in the user interface, a representation of a structure of the second function.

13. A computer program product for external storage and organization of documentation for computer-executable source code, the computer program product comprising a storage medium readable by a processing circuit, the storage medium storing instructions executable by the processing circuit to cause a method to be performed, the method comprising:
receiving, from a user, an indication of a selected codebase;
determining that a code comment database does not exist for the selected codebase;
generating a new code comment database for the selected codebase; and
presenting, to the user, a user interface for navigating the new code comment database;
prompting the user for code documentation; and
inserting the code documentation into the new code comment database.

14. The computer program product of claim 13, wherein the selected codebase is a first selected codebase, the method further comprising:
receiving, from the user, an indication of a second selected codebase;
retrieving an existing code comment database for the second selected codebase; and
presenting, to the user, a user interface for navigating the existing code comment database.

15. The computer program product of claim 14, the method further comprising:
scanning the second selected codebase to identify new structures in the second selected codebase;
generating new database entries corresponding to the new structures in the second selected codebase; and
updating the existing code comment database to include the new database entries.

16. The computer program product of claim 13, wherein the user interface comprises an indication of a first function in a nested hierarchy of functions and a first selectable indicia associated with the indication of the first function, the method further comprising:

receiving, from the user, a selection of the first selectable indicia;

displaying, in the user interface, a representation of a structure of the first function, the representation of the structure of the first function comprising i) an indication of one or more arguments of the first function, ii) an indication of one or more variables defined in the first function, and iii) an indication of one or more additional functions in the nested hierarchy of functions that are called by the first function; and displaying, in the user interface, code documentation corresponding to at least one of: i) the arguments of the first function, ii) the variables defined in the first function, or iii) the one or more additional functions in the nested hierarchy of functions.

17. The computer program product of claim 16, wherein the selectable indicia is a first selectable indicia, the method further comprising:

displaying, in the user interface, a second indicia in association with a second function of the one or more additional functions in the nested hierarchy of functions;

receiving, from the user, a selection of the second indicia; and displaying, in the user interface, a representation of a structure of the second function.

\* \* \* \* \*